much" US009027450B1

(12) United States Patent  
Ana

(10) Patent No.: US 9,027,450 B1  
(45) Date of Patent: May 12, 2015

(54) WORK PIECE CUTTING APPARATUS

(76) Inventor: Roland Santa Ana, Rockville, MD (US)

( * ) Notice: Subject to any disclaimer, the term of this patent is extended or adjusted under 35 U.S.C. 154(b) by 217 days.

(21) Appl. No.: 12/455,818

(22) Filed: Jun. 8, 2009

Related U.S. Application Data

(63) Continuation-in-part of application No. 10/542,987, filed as application No. PCT/US03/01769 on Jan. 21, 2003, now abandoned.

(51) Int. Cl.
| | |
|---|---|
| *B27B 5/18* | (2006.01) |
| *B23D 45/04* | (2006.01) |
| *B27B 27/10* | (2006.01) |
| *B23D 47/04* | (2006.01) |

(52) U.S. Cl.
CPC ............... *B23D 45/048* (2013.01); *B27B 5/18* (2013.01); *B23D 47/04* (2013.01); *B27B 27/10* (2013.01); *B23D 45/04* (2013.01)

(58) Field of Classification Search
CPC ........ B27B 27/10; B27B 5/18; B23D 45/048; B23D 47/04
USPC ............. 83/485–490, 471.3, 462, 468.7, 409, 83/465, 454, 466.1, 581, 781, 477.1, 83/435.12, 473; 269/303, 304, 319, 36, 269/86, 90, 203; D7/631; 248/122.1; 312/317.1–317.3
See application file for complete search history.

(56) References Cited

U.S. PATENT DOCUMENTS

| | | | |
|---|---|---|---|
| 2,590,093 A | | 3/1952 | Duerr, Jr. |
| 2,628,643 A | | 2/1953 | Tompkins |
| 2,705,005 A | * | 3/1955 | Tuorto ............................. 125/14 |
| 2,989,094 A | | 6/1961 | Panavas |
| 3,083,744 A | * | 4/1963 | Vold ............................. 83/468.3 |
| 3,570,564 A | * | 3/1971 | Bergler ......................... 83/471.3 |
| 3,598,162 A | * | 8/1971 | Rosenthal, Jr. .............. 83/486.1 |
| 3,603,360 A | * | 9/1971 | Botefuhr ...................... 83/486.1 |
| 3,635,206 A | * | 1/1972 | Harclerode ................ 125/13.03 |
| 3,664,389 A | | 5/1972 | Bower |
| 3,798,767 A | * | 3/1974 | Rizer et al. ....................... 83/485 |
| 4,152,961 A | * | 5/1979 | Batson ......................... 83/471.3 |
| 4,184,395 A | | 1/1980 | Blachly et al. |
| 4,428,159 A | * | 1/1984 | Sigetich et al. ............ 125/13.03 |
| 4,489,633 A | | 12/1984 | van de Wouw |
| 4,553,462 A | | 11/1985 | Silken |

(Continued)

FOREIGN PATENT DOCUMENTS

| | | | |
|---|---|---|---|
| CA | 2513694 A1 | * | 8/2004 |
| DE | 2908211 B1 | * | 6/1980 |

(Continued)

*Primary Examiner* — Jason Daniel Prone  
(74) *Attorney, Agent, or Firm* — Hoang Steve Ngo

(57) ABSTRACT

A work piece cutting apparatus including a base, a work table, a support post defining a void for a work piece being worked on to pass at least partially through the void, a cutting device, and attachment assembly for securing the cutting device to the support post. Another embodiment of the above apparatus includes a work table being movable to angle orientations relative to the base, and a locking mechanism for locking the work table into angle orientations. A further embodiment is an apparatus adapted for receiving a cutting device. The apparatus includes a base, a work table, and a tool dock base located about the work table. The tool dock base is adapted for receiving a cutting device. Another embodiment of the above apparatus includes a work table being movable to angle orientations relative to the base, and a locking mechanism for locking the work table into angle orientations.

10 Claims, 7 Drawing Sheets

(56) References Cited

U.S. PATENT DOCUMENTS

| | | | |
|---|---|---|---|
| 4,869,142 A | 9/1989 | Sato et al. | |
| 4,875,399 A * | 10/1989 | Scott et al. | 83/471.3 |
| 4,991,354 A * | 2/1991 | Schweickhardt | 125/35 |
| 5,063,806 A | 11/1991 | Mayfield | |
| 5,179,886 A * | 1/1993 | Rathje, Jr. | 83/471.3 |
| 5,241,888 A * | 9/1993 | Chen | 83/471.3 |
| 5,287,779 A * | 2/1994 | Metzger, Jr. | 83/471.3 |
| 5,287,780 A | 2/1994 | Metzger, Jr. et al. | |
| 5,303,755 A * | 4/1994 | Poling | 83/471.3 |
| 5,331,875 A | 7/1994 | Mayfield | |
| 5,353,670 A * | 10/1994 | Metzger, Jr. | 83/471.3 |
| 5,421,228 A | 6/1995 | Fukinuki | |
| 5,437,319 A | 8/1995 | Garuglieri | |
| 5,482,026 A * | 1/1996 | Russell | 125/13.01 |
| 5,524,516 A * | 6/1996 | Sasaki et al. | 83/471.3 |
| 5,564,323 A * | 10/1996 | Sasaki et al. | 83/471.3 |
| 5,664,612 A * | 9/1997 | Klemma | 83/471.3 |
| 5,730,434 A * | 3/1998 | Schoene et al. | 83/464 |
| 5,819,624 A * | 10/1998 | Brault et al. | 83/471.3 |
| 5,842,400 A | 12/1998 | McIntosh | |
| 5,855,366 A * | 1/1999 | Chang | 83/471.3 |
| 5,865,079 A | 2/1999 | Itzov | |
| 5,868,185 A | 2/1999 | Poling et al. | |
| 5,918,522 A * | 7/1999 | Benedict et al. | 83/478 |
| 5,957,021 A * | 9/1999 | Meredith et al. | 83/471.3 |
| 5,988,031 A * | 11/1999 | Wixey | 83/471.3 |
| 6,016,732 A * | 1/2000 | Brault et al. | 83/471.3 |
| 6,073,529 A * | 6/2000 | Shibata et al. | 83/471.3 |
| 6,289,778 B1 * | 9/2001 | Wixey | 83/471.3 |
| 6,481,322 B1 * | 11/2002 | Hsiung | 83/471.3 |
| 6,561,068 B2 * | 5/2003 | Meredith et al. | 83/471.3 |
| 6,752,140 B1 * | 6/2004 | Fuhrman et al. | 83/471.3 |
| 6,938,528 B2 * | 9/2005 | Lewis | 83/466.1 |
| 7,156,008 B2 * | 1/2007 | Talesky | 83/468.2 |
| 7,228,774 B2 * | 6/2007 | Stolzer | 83/451 |
| 7,395,745 B2 * | 7/2008 | Gehret et al. | 83/471.3 |
| D574,401 S * | 8/2008 | Bettacchini et al. | D15/133 |
| 7,490,599 B2 * | 2/2009 | Governo | 83/490 |
| 7,726,224 B1 * | 6/2010 | Panko | 83/471.3 |
| 7,752,951 B2 * | 7/2010 | Ouellette | 83/471.3 |
| 7,854,187 B2 * | 12/2010 | Liu et al. | 83/471.3 |
| 7,891,277 B2 * | 2/2011 | Ouellette | 83/471.3 |
| 8,220,372 B2 * | 7/2012 | Janson | 83/399 |
| 8,302,518 B2 * | 11/2012 | Rybka et al. | 83/468.4 |
| 8,485,078 B2 * | 7/2013 | Janson | 83/399 |
| 8,549,971 B2 * | 10/2013 | Rybka et al. | 83/471.3 |
| 2002/0100350 A1 * | 8/2002 | Brazell | 83/471.3 |
| 2002/0100351 A1 * | 8/2002 | Bean et al. | 83/471.3 |
| 2003/0033921 A1 * | 2/2003 | Chang | 83/471.3 |
| 2004/0074361 A1 * | 4/2004 | Svetlik et al. | 83/471.3 |
| 2006/0101971 A1 * | 5/2006 | Roe | 83/581 |
| 2008/0022825 A1 * | 1/2008 | Spinelli et al. | 83/471.3 |
| 2012/0186410 A1 * | 7/2012 | Lacy | 83/441 |

FOREIGN PATENT DOCUMENTS

| | | |
|---|---|---|
| JP | 2005178281 A * | 7/2005 |
| JP | 2005212463 A * | 8/2005 |
| WO | WO 2004067236 A1 * | 8/2004 |

* cited by examiner

WORK PIECE CUTTING APPARATUS

CROSS-REFERENCE TO RELATED APPLICATION

This application is a continuation-in-part of and claims the benefit of U.S. patent application Ser. No. 10/542,987, now abandoned, filed Jul. 2, 2005, titled "Combination Table-Miter Saw Assembly," and which is a U.S. National Stage filing of International Patent Application Number PCT/US2003/001769 filed Jan. 21, 2003, the subject matters of both applications are incorporated by reference herein.

TECHNICAL FIELD

This invention relates in general assemblies for saws, in particular to assemblies for table saws and miter saws. This invention is a novel combination table-miter saw and assembly with the ability to adjust the orientation of the saw unit in different angles, thus permitting the use of the tool as a table saw or as a miter saw at user's preference and in a short period of time.

BACKGROUND ART

The prior art has diverse examples of saws and saw assemblies, all achieving distinct purposes. Nevertheless, none of the inventions present in the prior art disclose the improvement subject of this application, a combination table-miter saw and assembly with the novel characteristic of allowing the adjustment of the orientation of the saw for cutting a workpiece at different angles, therefore being able to adjust the tool into a table saw or into a miter saw.

U.S. Pat. No. 5,868,185 (Poling et al, 1999) describes a folding workbench system. The invention in the prior art is different to the combination table-miter saw and assembly because the first is a folding workbench system that does not resemble the assembly of the combination table-miter saw and assembly. The prior art invention does not have a work table with a radial shaped side such as the miter saw platform (1b) of the combination table-miter saw and assembly. In addition, this prior art invention does not include the safety mechanism or the adjustable foot bases of the combination table-miter saw and assembly.

U.S. Pat. No. 5,865,079 (Itzov, 1999) claims an adjustable workpiece support apparatus for a compound miter saw. This invention is different from the combination table-miter saw and assembly because it only refers to a miter saw, while the invention subject of this application refers to a tool and assembly that can be used as a table saw or as a miter saw at user's preference. Moreover, the prior art invention does not include two platforms such as the table saw platform (1a) and the radial shaped miter saw platform (1b), nor the safety mechanism or adjustable foot bases of the combination table-miter saw and assembly.

U.S. Pat. No. 5,842,400 (McIntosh, 1998) describes a table saw assembly with elements that are different from the elements of the combination table-miter saw and assembly. Although the invention in the prior art may do both straight and angled cuts, the combination table-miter saw and assembly has different elements such as the table saw platform (1a) and miter saw platform (1b), and is therefore aesthetically very different from the prior art invention. Moreover, the prior art invention does not have the safety mechanism nor the adjustable foot pads of the combination table-miter saw and assembly. In addition, the combination table-miter saw and assembly may be smaller and therefore occupy less space, thus giving greater advantage to user.

U.S. Pat. No. 5,437,319 (Garuglieri, 1995) is for a pivoting power tool with a table. The combination table-miter saw and assembly differs from the invention in the prior art because it has different elements, such as the table saw platform (1a) and miter saw platform (1b), and is therefore aesthetically very different from the prior art invention.

U.S. Pat. No. 5,331,875 (Mayfield, 1994) and U.S. Pat. No. 5,063,806 (Mayfield, 1991) are for an anti-kick forward device for radial arm saws. This combination table-miter saw and assembly invention differs from the inventions in the prior art because it has novel elements, such as the table saw platform (1a) and miter saw platform (1b), and is therefore aesthetically very different from the prior art inventions. In addition, the combination table-miter saw and assembly may be smaller and therefore easier to store and to transport from one place to another.

U.S. Pat. No. 5,353,670 (Metzger, Jr., 1994) is for independently and jointly operable radial saw guards; U.S. Pat. No. 5,287,780 (Metzger, Jr. et al, 1994) describes a radial arm saw guard with operational interlock; and U.S. Pat. No. 5,287,779 (Metzger, Jr., 1994) claims radial safety guards and barriers. These inventions differ from the combination table-miter saw and assembly because the latter is for a tool or saw to be used either as a table saw or a miter saw in a single assembly, and it has novel elements such as the table saw platform (1a) and miter saw platform (1b). In addition, the combination table-miter saw and assembly is aesthetically very different from the prior art inventions for the first has adjustable and removable non-slip foot bases (9) while the prior art inventions have long legs to support their tables.

U.S. Pat. No. 5,179,886 (Rathje, Jr., 1993) is for a radial beam arm saw table. This invention is different to the combination table-miter saw and assembly because the invention in the prior art has different elements than the combination table-miter saw and assembly. The combination table-miter saw and assembly has a characteristic table saw platform (1a) and miter saw platform (1b). In addition, the combination table-miter saw and assembly is aesthetically very different from the prior art invention for the first has non-slip foot bases (9) while the prior art invention has long legs to support its table. Furthermore, since the prior art invention has a table with long legs, it needs more stability, hence the use of the water tank, which gives stability or rigidity to the stand. This problem is not encountered by the combination table-miter saw and assembly, which has a smaller platform and foot bases, therefore having no stability nor rigidity issues, therefore being more practical for user. Moreover, the combination table-miter saw and assembly may be easily transported to any place chosen by user without the need to use water, which further differentiates it from the invention in the prior art.

U.S. Pat. No. 4,553,462 (Silken, 1985) claims a radial arm saw; U.S. Pat. No. 4,489,633 (van de Wouw, 1984) claims a sawing device and associated clamp and safety cap; U.S. Pat. No. 4,184,395 (Blachy et al, 1980) describes a radial arm saw; and U.S. Pat. No. 3,664,389 (Bower, 1972) makes reference to a lateral adjustment means for radial arm saws. The inventions in the prior art are aesthetically different to the combination table-miter saw and assembly because they do not have the novel table saw platform (1a) nor the miter saw platform (1b) as the workplace where the work piece will be cut.

U.S. Pat. No. 2,989,094 (Panavas, 1961) is for adjustable stops and guide bar for power tool; U.S. Pat. No. 2,628,643 (Tompkins, 1953) is for a wood sawing machine; and U.S. Pat. No. 2,590,093 (Fuerr, Jr., 1952) is for a hand-operated motor-driven radial machine tool. These inventions differ from the combination table-miter saw and assembly because their elements are different. In addition, the combination table-miter saw and assembly may be portable and therefore giving greater advantages to user.

SUMMARY OF THE INVENTION

The present invention embodies a novel combination table-miter saw and assembly that allows the orientation of the saw to be adjusted at the worktable assembly and therefore may be used to perform multiple tasks with the same saw unit which may be used as a miter saw or as a table saw at user's preference. The elements of this invention are comprised of:

(a) A power tool or saw including a main saw unit (18), a saw blade (20), a handle grip with a motor switch control assembly (19), a motor (21), and a saw unit slide bar (16);

(b) A safety mechanism for the power tool or saw, comprising a locking knob assembly (11) for the slide bar (16) on the support post (3), a stay-down blade lock knob (12), and a switch control for table saw (13);

(c) A support post (3) attached to the rotatable work table and that connects the saw unit (18) to a side of the worktable, including a knob handle tilt control (10) and an angle tilt scale (15);

(d) The rotatable work table comprised of a table saw platform (1a) and a miter saw platform (1b) that has a radial shape, having the table saw platform (1a), a platform table insert (22), a rail guide slot ramp (7), a scale marking (8), and a locking handle assembly (17);

(e) An undercarriage secured to the worktable and that allows the platforms to rotate, also including a miter saw fixed fence base (14) and four adjustable non-slip foot bases (9) attached to each corner of the undercarriage; and (f) A stationary but removable fence (2), including a rail guide clamp handle (5), rail guide bar (6) and two clamp bolt knobs (4).

The combination table-miter saw and assembly can be operated as a table saw or as a miter saw. In case of a miter saw, the preferred embodiment may also be operated as a sliding miter saw. Some of the above elements will be relevant when used as a table saw, and others when used as a miter saw, as explained below.

For using the tool as a miter saw, user can put the work piece across the platform and against the fence (2) that has been placed on the miter saw fixed fence base (14). In addition, user may determine the cutting angle by rotating the worktable with the locking handle assembly (17).

The worktable may rotate but is secured to an undercarriage including a fixed fence base (14) and four adjustable and removable non-slip foot bases (9) attached to each corner of the undercarriage. In addition, the support post (3) has a knob handle tilt control (10) that may be tightened to adjust the saw blade to a desired angle that shall be indicated on the angle tilt scale (15). These elements (10 and 15) may be used for performing compound angled cuts.

The saw unit slide bar arm (16) permits the saw unit (18) to slide, therefore being able to be used not only as a fixed miter saw, but also as a sliding miter saw, thus being able to cut from front to back of the work table and vice versa, and cutting as wide as 12 inches or greater. The desired angle for cutting is indicated by the scale at the miter saw platform (1b). With respect to the saw itself, user can operate it in miter saw mode by pressing the handle grip with motor switch control assembly (19) with his or her hand. Thereafter the motor (21) will be turned on, and the saw blade (20) will be ready for cutting. Therefore, for safety reasons, it is recommended that user place the work piece to be cut on the worktable or miter saw platform (1b), adjust the angle, and thereafter begin cutting it with the saw. The support post (3) which connects the saw unit (18) to a side of the work table shall be shaped in a manner that allows the work piece to have clearance to pass through. This support post (3) may be shaped as a "C."

In addition, the fence (2) secures the work piece in place for cutting. The platform table insert (22) protects the saw blade (20) in case the saw unit (18) was carelessly handled by user and the saw blade (20) was misaligned.

To be operated under table saw mode, user must remove the fence (2) from its position, place the rail guide bar (6) inside the rail guide slot ramp (7) at the table saw platform (1a), and secure it by clamp or bolt knobs (4) to the side of the table saw platform (1a). The fence (2) may be used as a rail guide for the table saw conversion. The scale marking (8) in inches or centimeters serves as a guide to adjust the fence (2) to the desired width for cutting. The work piece must then be placed on the table saw platform (1a) and the saw blade (20) will cut it on top of the platform table insert (22). The work piece may also be cut in an angle for the saw blade (20) may be adjusted to an angle by the knob handle tilt control (10) on the support post (3).

To operate the saw under table saw mode, user must first tighten the slide bar's locking knob assembly (11) to secure the saw unit (18) into a set position to avoid accidents; thereafter lock the stay down blade lock knob (12) which secures the saw blade (20) into a downward position, and finally pushing the safety switch control (13) to lock the saw unit (18) into place. Unless these three elements of the safety mechanism (locking knob assembly (11), stay down lock knob (12), and safety switch control (13)) are locked or activated, user may not operate the tool as a table saw.

User may determine the angle of the cut in table saw mode by operating the knob handle tilt control (10) that can be tightened to adjust the saw blade (20) to the desired angle which will be indicated on the angle tilt scale (15). In addition, user may determine the length of the cut with the scale marking (8) at table saw platform (1a).

OBJECTS AND ADVANTAGES OF THE INVENTION

The present invention constitutes a significant improvement in several aspects of previously identified efforts of the prior art as described below.

An object of the present invention is to provide a convenient work tool assembly that permits user to adjust the orientation of the tool in order to perform multiple tasks with the same work tool, being able to use this work tool as a miter saw or as a table saw. Therefore, user may perform several types of tasks with this novel invention, such as but not limited to cutting work pieces as a table saw e.g. cutting in a straight line or 90 degree angle, cross cutting, extended cross cutting, rip cutting, rip bevel cutting. When user accommodates the saw to be used as a miter saw, the tool will be able to do cuts such as but not limited to angle cutting, miter cutting, extended miter cutting, and compound angle cutting.

Another advantage of the present invention is that the combination table-miter saw and assembly will allow user to accommodate and cut work pieces of different thickness and diameter, being such work pieces such as but not limited to metal, wood, plywood, rubber or plastic.

Yet another object and advantage of this combination table-miter saw and assembly is to provide a tool that can easily be converted from a table saw to a miter saw or vice versa in a short period of time. The fact that one tool can have both uses of a table saw or a miter saw in one same equipment allows user to reduce space at his or her workplace for the invention provides less cumbersome tools for a tight workplace environment.

A further advantage of this combination table-miter saw and assembly is that since it can be used as a table saw or as a miter saw, user may have both uses in one single machine. Therefore, if user has to work in a construction site where he or she would have needed to transport both tools, he or she may save time in transporting this invention.

Yet another advantage of this combination table-miter saw and assembly is that it is very economical, for it provides two traditional tools in one, having a table saw and miter saw in one same assembly. Moreover, one embodiment of this invention may also permit the saw to slide, therefore also having a sliding miter saw with the same tool.

A further advantage of the present invention is that it is compatible to be used with various blades of different manufacturers, which makes it an invention flexible for the market.

Another advantage of the combination table-miter saw and assembly is that it has four adjustable and removable non-slip foot bases (9). The benefit conferred by these foot bases is that they may be adjustable in case the surface where the combination table-miter saw and assembly is placed were to be uneven and they prevent the invention from rocking, slipping or sliding on a surface.

Another object of the combination table-miter saw and assembly is to provide a tool whose support post (3) permits a work piece to pass through without an obstruction in the middle, therefore permitting user to do ripping, bevel cuts or angled cuts with the saw.

Another object and advantage of the combination table-miter saw and assembly is that it provides effective safety features for user. The table saw may only be activated by first tightening the locking knob assembly (11) securing the saw unit slide bar (16) into place. Thus, the saw unit (18) will not be able to slide forward towards user. In addition, user must lock the stay down lock knob (12) which brings the saw blade (20) down into the platform table insert (22) and secures it in place. Finally, user must activate the safety switch control (13) in order to operate the table saw. Unless these three elements of the safety mechanism (locking knob assembly (11), stay down lock knob (12), and safety switch control (13)) are locked or activated, user may not operate the tool as a table saw. Therefore, user is protected from the saw unit (18) sliding towards him or her and from the saw blade (20) getting out of place by the security features mentioned herein above. Thus, this combination table-miter saw and assembly has efficient means of protecting user from accidents.

A further advantage of this invention is that it includes a stationary but removable fence (2) that may be used as a support for the miter saw and as a rail guide for the table saw conversion, therefore reducing the amount of parts needed to operate the invention in both saw modes.

Finally, another advantage of the combination table-miter saw is that a work piece may enter or start in the front or in the back of the table saw platform (1a), at user's preference and depending on the use of the saw blade (20). This is an advantage because by being able to start the work piece behind the saw unit (18), user prevents kickback and jamming (the latter being able to ruin the motor) from any big teeth blade, and therefore prevents accidents.

DETAILED DESCRIPTION OF THE PREFERRED EMBODIMENTS

Figure 1:
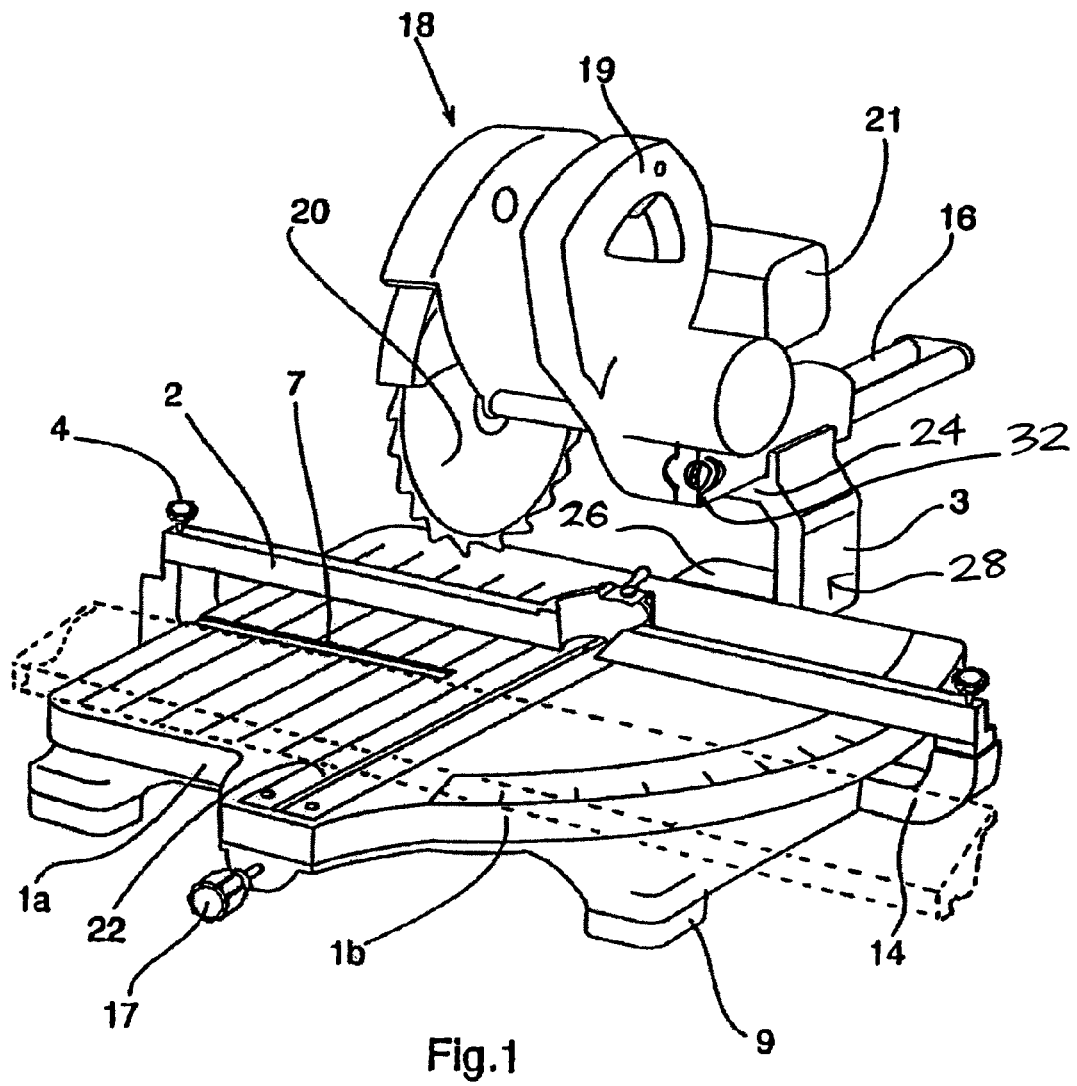
FIG. 1 is an environmental, perspective front and first side view of an embodiment of a work piece cutting apparatus according to the present invention, wherein the apparatus is in a miter saw mode, an example of a cutting device is a sliding miter saw, an example of a support post has a "C" shape, and a work piece is positioned from a first side to a second side of a work table.
Figure 2:
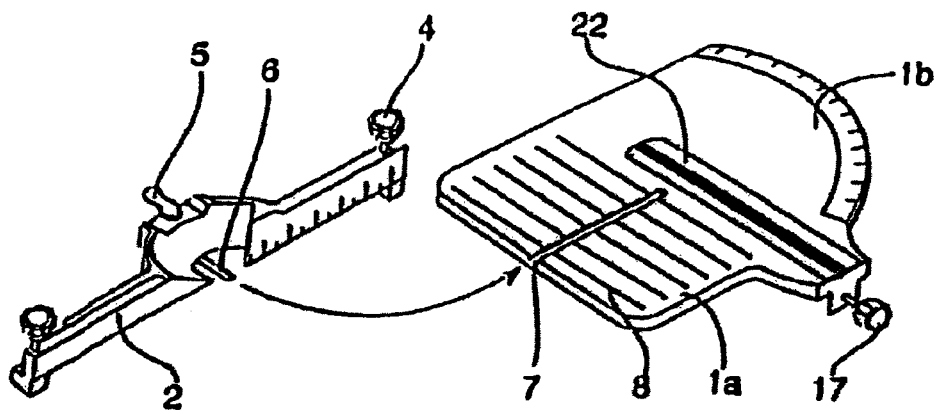
FIG. 2 is a perspective view of a work table and a fence, wherein both are to be used when the apparatus of FIG. 1, or alternatively an apparatus adapted for receiving a cutting device, is in a table saw mode.
Figure 3A:
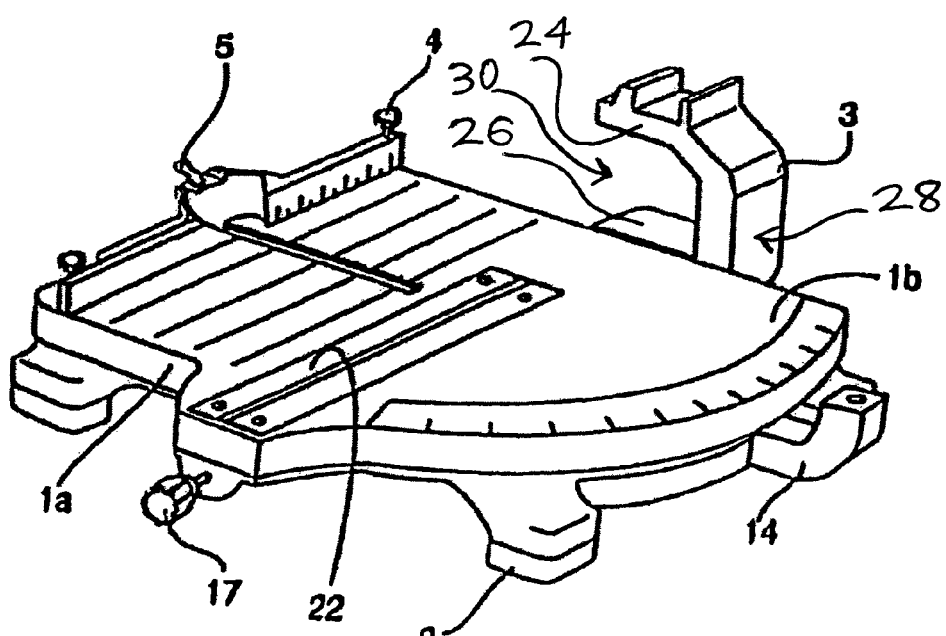
FIG. 3A is a perspective front and first side view of an embodiment of an apparatus adapted for receiving a cutting device, or alternatively the apparatus of FIG. 1 excluding a cutting device, according to the present invention, wherein the apparatus is in a table saw mode and an example of a support post or tool dock base has a "C" shape.
Figure 3:
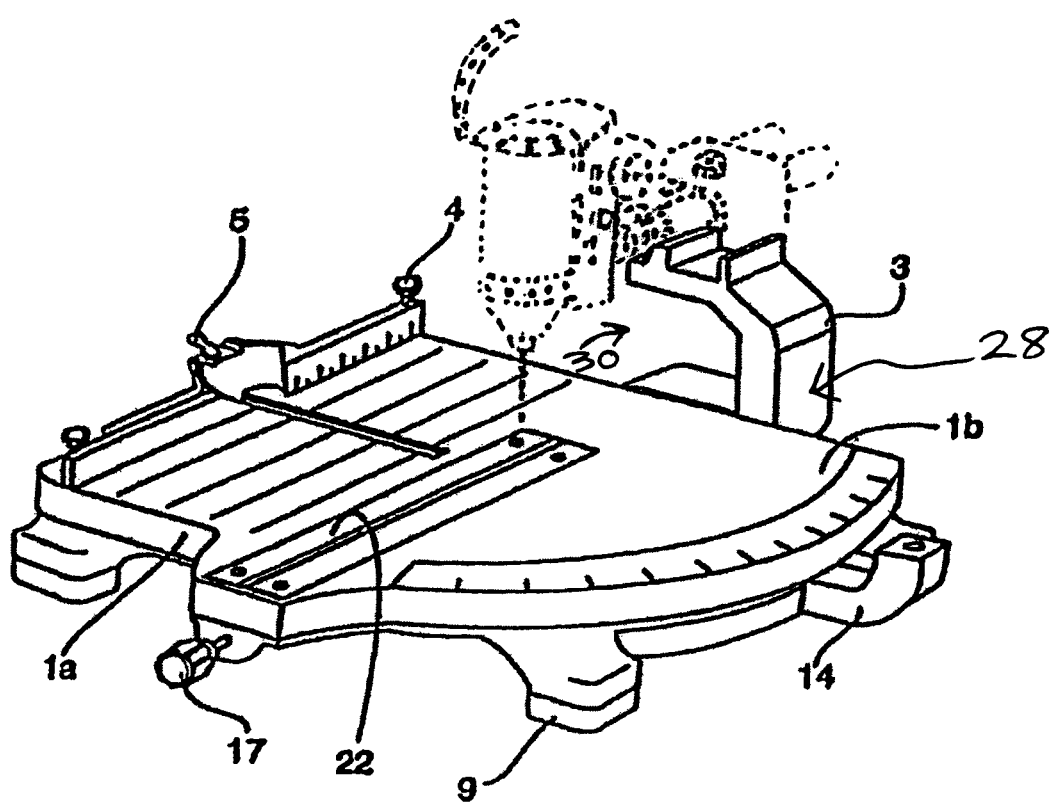
FIG. 3B is an environmental, perspective front and first side view of the apparatus of FIG. 3A, wherein a drill is attached to the tool dock base.
FIG. 3C is an environmental, perspective front and first side view of the apparatus of FIG. 3A, wherein another drill is attached to the tool dock base and a work piece is positioned from a front to a rear of the work table along the second side.
FIG. 3D is a perspective view of a base of the apparatus of FIG. 1, or alternatively an apparatus adapted for receiving a cutting device.
Figure 3C:
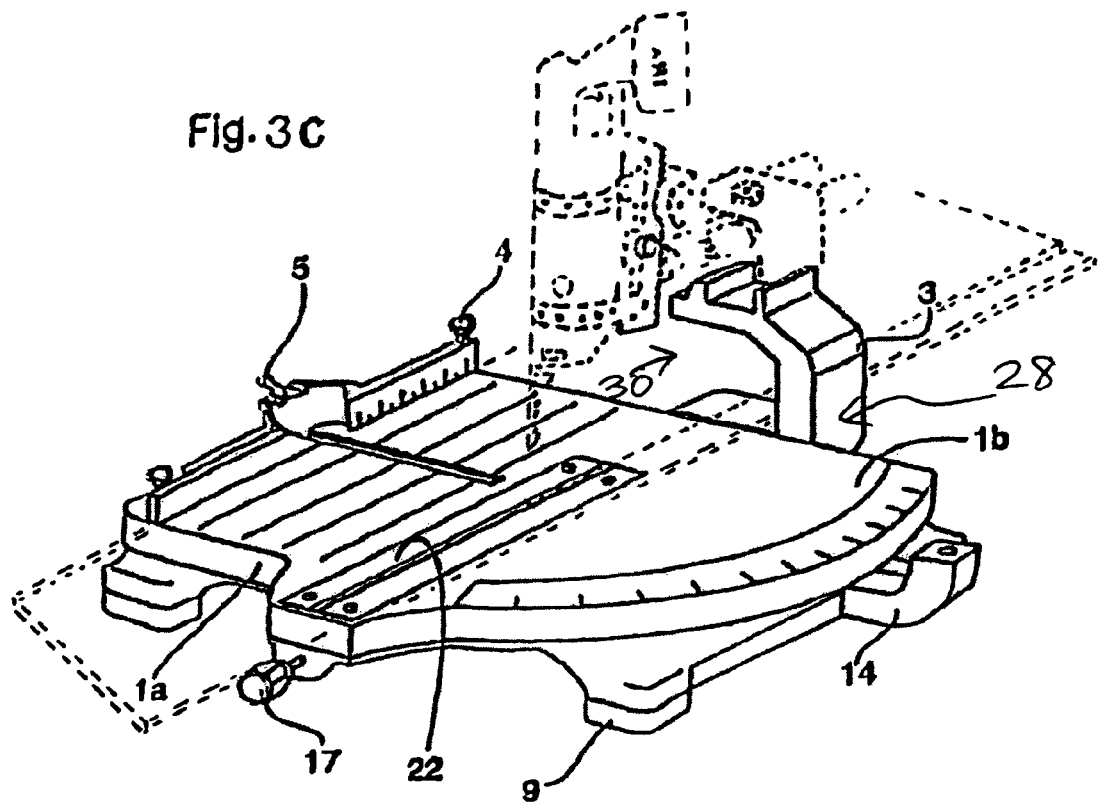
Figure 3D:
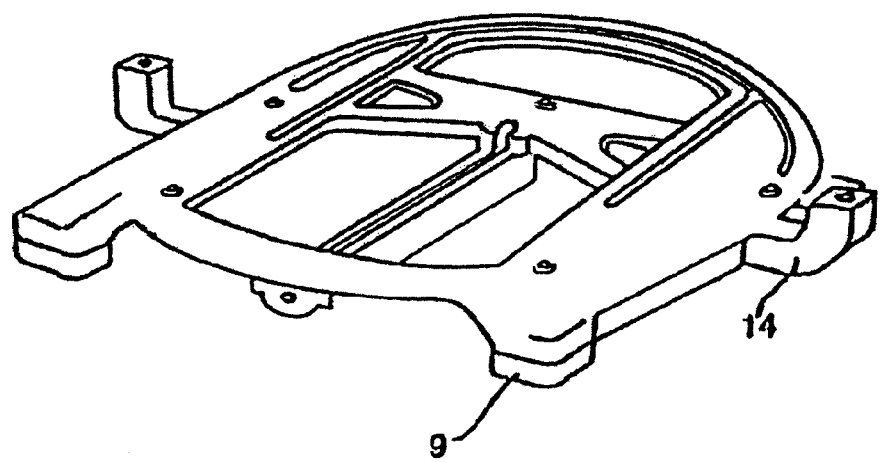

Having described the invention and its modes of operation in the paragraphs hereinabove, following is the description of the preferred embodiment. The elements of the preferred embodiment of this combination table-miter saw and assembly invention are comprised of:

(a) A power tool or saw including a main saw unit (18), a saw blade (20), a handle grip with a motor switch control assembly (19), a motor (21), and a saw unit slide bar (16);

(b) A safety mechanism for the power tool or saw, comprising a locking knob assembly (11) for securing the slide bar (16) on the support post (3) and therefore secure the saw unit (18) in place, a stay-down blade lock knob (12) to secure the blade (20) to a downward position, and a switch control for table saw (13);

(c) A support post (3) shaped as a "C" attached to the rotatable worktable and that connects the saw unit (18) to a side of the worktable, including a knob handle tilt control (10) that when loosened may determine the angle of the saw blade (20) and an angle tilt scale (15) that will indicate the chosen angle;

(d) The rotatable work table comprises a table saw section (1a) and a miter saw section (1b). The miter saw section (1b)

has a radial shape. The worktable includes a platform table insert (22) where the saw blade (20) will perform its cutting, a rail guide slot ramp (7) in the table saw section (1a), for placing the fence (2) when the invention is used as a table saw, a scale marking (8) in inches or centimeters to guide the fence (2), and a locking handle assembly (17) to turn the platform to a desired angle;

(e) An undercarriage secured to the worktable that allows the worktable to rotate, including a miter saw fixed fence base (14) for placing the fence (2) for operation of the invention under miter saw mode, and four adjustable and removable non-slip foot bases (9) attached to each corner of the undercarriage; and (f) A stationary but removable fence (2), including a rail guide clamp handle (5) to be inserted with the rail guide bar (6) into the rail guide slot ramp (7) for securing the fence (2) to the worktable for table saw operation, and two clamp bolt knobs (4) that secure the fence (2) to the worktable.

The preferred embodiment of the invention shall be made of metal, except for the non slip foot base (9) that shall be made of rubber and the platform table insert (22) that shall be made of plastic.

With respect to the best mode and operation of the invention, the combination table-miter saw and assembly may be operated as a table saw or as a sliding or fixed miter saw.

For using the tool as a miter saw, user can put the work piece across the platform and against the fence (2) that has been placed on the miter saw fixed fence base (14). In addition, user may determine the cutting angle by rotating the worktable with the locking handle assembly (17).

The worktable may rotate but is secured to an undercarriage including a fixed fence base (14) and four adjustable and removable non-slip foot bases (9) attached to each corner of the undercarriage. In addition, the arm support (3) has a knob handle tilt control (10) that may be tightened to adjust the saw blade (20) to a desired angle that shall be indicated on the angle tilt scale (15). These elements (10 and 15) may be used for performing compound angled cuts.

The saw unit slide bar (16) permits the saw unit (18) to slide, therefore being able to be used not only as a fixed miter saw, but also as a sliding miter saw, thus being able to cut from front to back of the work table and vice versa, and cutting as wide as 12 inches or greater. The desired angle for cutting is indicated by the scale at the miter saw platform (1b). With respect to the saw itself, user can operate it in miter saw mode by pressing the handle grip with motor switch control assembly (19) with his or her hand. Thereafter the motor (21) will be turned on, and the saw blade (20) will be ready for cutting. Therefore, for safety reasons, it is recommended that user place the work piece to be cut on the worktable or miter saw platform (1b), adjust the angle, and thereafter begin cutting it with the saw. The support post (3) which connects the saw unit (18) to a side of the worktable shall be shaped in a manner that allows the work piece to have clearance to pass through. In the preferred embodiment, this support post (3) shall be shaped as a "C." As shown in FIGS. 1, 3A, 3B, 3C, 4 and 5, the support post (3) comprises an upper portion (24), a lower portion (26), an open end (30), a vertical extension (28) defining a closed end (28), and a longitudinal axis extending from the closed end (28) to the open end (30), and wherein the vertical extension (28) extends downward from the upper portion (24).

In addition, the fence (2) secures the work piece in place for cutting. The platform table insert (22) protects the saw blade (20) in case the saw unit (18) was carelessly handled by user and the saw blade (20) was misaligned.

To be operated under table saw mode, user must remove the fence (2) from its position, place the rail guide bar (6) inside the rail guide slot ramp (7) at the table saw platform (1a), and secure it by clamp or bolt knobs (4) to the side of the table saw platform (1a). The fence (2) maybe used as a rail guide for the table saw conversion. The scale marking (8) in inches or centimeters serves as a guide to adjust the fence (2) to the desired width for cutting. The work piece must then be placed on the table saw platform (1a) and the saw blade (20) will cut it on top of the platform table insert (22). The work piece may also be cut in an angle because the saw blade (20) may be adjusted to an angle by the knob handle tilt control (10) on the arm support (3).

Figure 4:
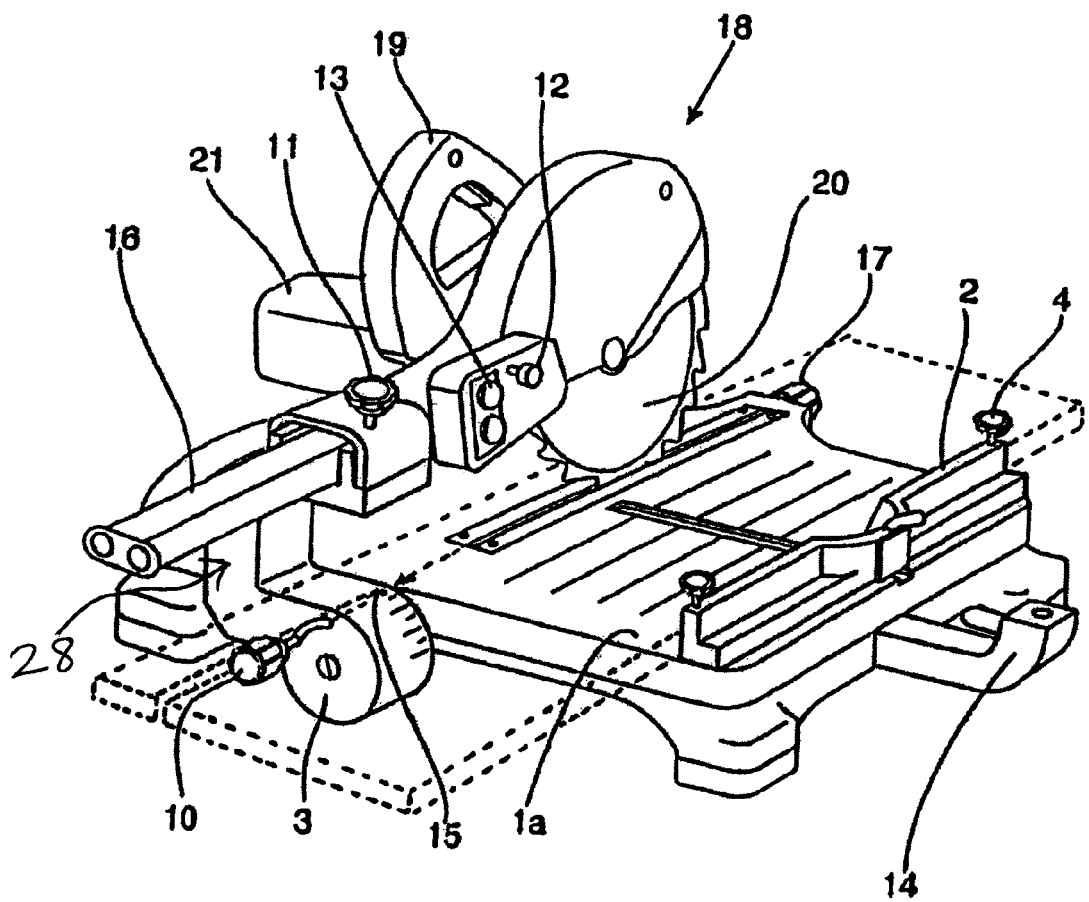
FIG. 4 is an environmental, perspective rear and second view of the apparatus of FIG. 1, wherein a work piece is positioned from a front to a rear of the work table along the second side.

To operate the saw in table saw mode, as shown in FIG. 4, the user must first tighten the slide bar locking knob assembly (11) to secure the saw unit (18) into a set position to avoid accidents; thereafter lock the stay down blade lock knob (12) which secures the saw blade (20) into a downward position, and finally pushing the safety switch control (13) to lock the saw unit (18) into place. Unless these three elements (locking knob assembly (11), stay down lock knob (12), and safety switch control (13)) of the safety mechanism are locked or activated, user may not operate the tool as a table saw.

User can determine the angle of the cut in table saw mode by operating the knob handle tilt control (10) that can be tightened to adjust the saw blade (20) to the desired angle which will be indicated on the angle tilt scale (15). In addition, user may determine the length of the cut with the scale marking (8) at the table saw platform (1a).

Figure 5:
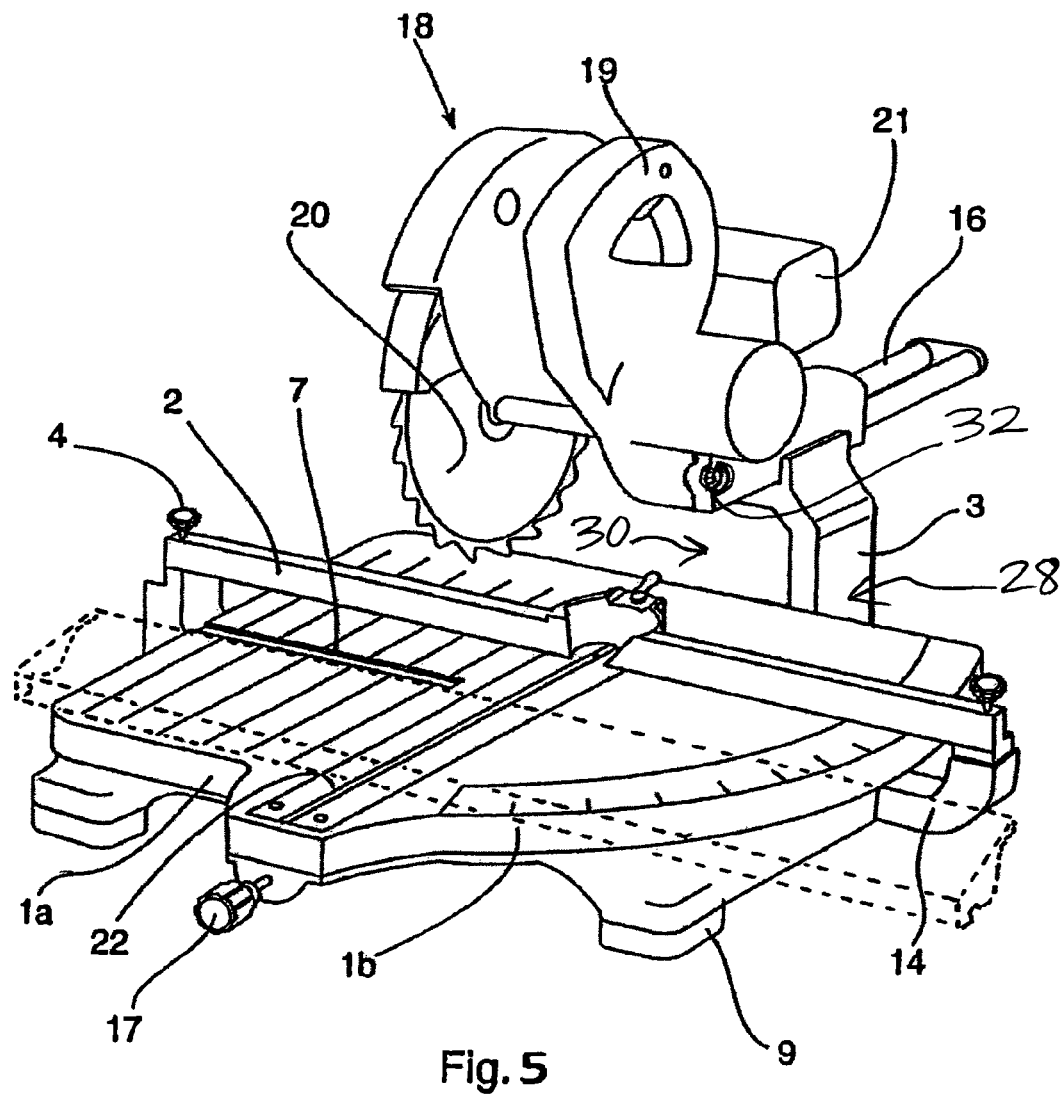
FIG. 5 is an environmental, perspective front and first side view of an embodiment of a work piece cutting apparatus according to the present invention, wherein the apparatus is in a miter saw mode, an example of a cutting device is a sliding miter saw, an example of a support post has an "L" shape, and a work piece is positioned from a first side to a second side of a work table.
Figure 6:
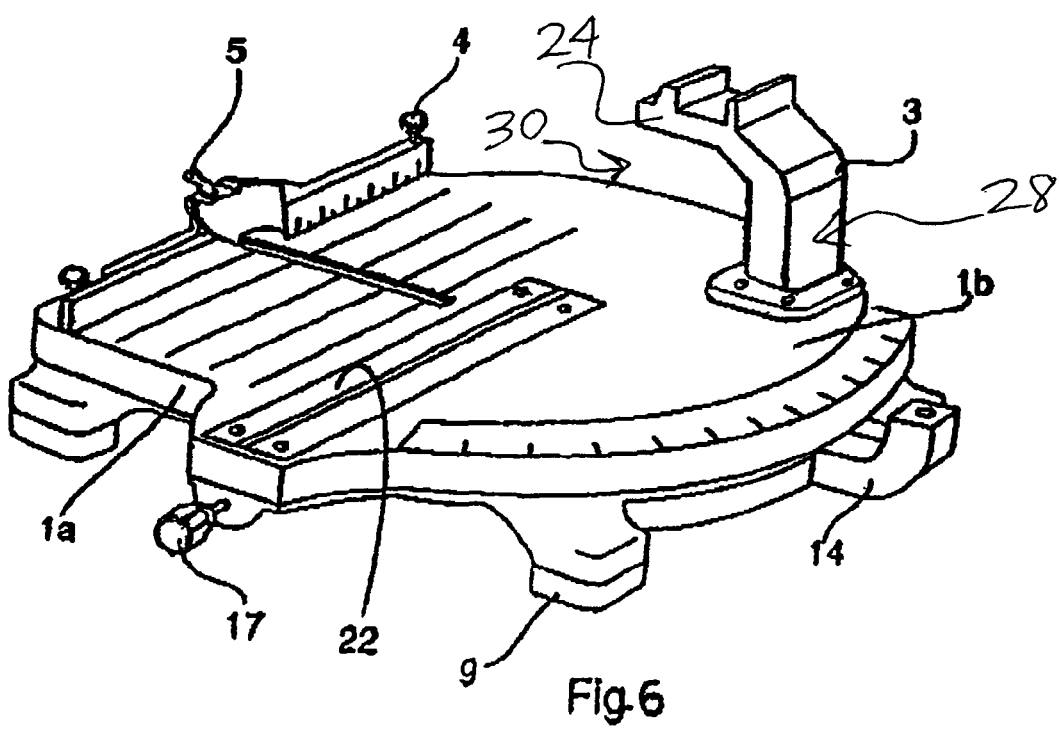
FIG. 6 is a perspective front and first side view of an embodiment of an apparatus adapted for receiving a cutting device, or alternatively a work piece cutting apparatus excluding a cutting device, according to the present invention, wherein the apparatus is in a table saw mode and an example of a support post or tool dock base has an "L" shape.

Preferably, the cutting device attachment assembly comprises a joint (32) or a hinge (32) to allow the cutting device, such as a saw, to be alternatively placed in miter saw mode, as shown in FIGS. 1 and 5, or in table saw mode, as shown in FIG. 4. The cutting device is movable from an upper position, as shown in FIGS. 1 and 5, to a lower position (not shown, but is similar to the lower position shown in FIG. 4) and from the lower position to the upper position when the work piece cutting apparatus is in miter saw mode. At least one of the lower position and upper position is a cutting position for cutting the work piece when the work piece cutting apparatus is in miter saw mode. The cutting device is secured in a locked-down cutting position, as shown in FIG. 4, for cutting the work piece when the work piece cutting apparatus is in table saw mode.

DESCRIPTION OF ALTERNATE EMBODIMENTS

From a broad standpoint, the present invention is a rotary tool. First provided is a rotatable worktable defining an interior cutting slot and a guide slot. Next provided is an upright rotatable support post peripherally attached to the rotatable worktable. The upright rotatable support post has an upper portion defining a tool dock. A detachable descending tool unit releasably attached to the rotatable support post having a handle and defining a slide bar arm adapted to be housed slidably within the dock. Next provided is a rotary tool having a periphery. In this manner, the support post is adapted to selectively position the tool periphery with respect to the worktable. Lastly, a removable fence is provided. The removable fence is adapted to selectively affix to the rotatable worktable in a first position perpendicular to the cutting slot and a second position perpendicular to the guide slot.

The present invention embodies a combination table-miter saw & assembly. As mentioned above, the preferred embodiment of the invention is made of metals. Alternative embodiments of the invention are made of materials such as but not limited to plastic, rubber or man made materials. With respect to the locking handle assembly (17), the preferred embodiment is made of metal, and alternate embodiments may be made of rubber, plastic or man made materials. In connection to the adjustable and removable non slip foot base (9), the preferred embodiment is made of rubber, while other embodiments may have such element made of materials such as but not limited to plastic or man made materials. The saw blade (20) may be made of metal or of carbide.

In an embodiment of the invention the work tool may be used as a table saw or as a fixed miter saw. In this embodiment, the saw unit slide bar (16) is suppressed from the invention.

In another embodiment of the invention, user may remove the saw unit (18), the handle with grip with motor switch control assembly (19), the saw blade (20), and the motor (21), and replace them with any other compatible elements that may be sold in the market and that serve the same purposes. Therefore, this embodiment may be flexible to adjust to other saw units in the market.

The invention is not however limited to materials and embodiments described above; they are given as examples only. The scope of the invention should be determined by its claims, and not by a particular embodiment of the invention.

What is claimed is:

1. A multi-mode work piece cutting apparatus comprising:
a base;
a work table comprising a front, a rear, and a pair of sides, wherein said work table is positioned above and attached to said base;
a support post secured to at least one of said base and said work table, wherein said support post comprises a void portion;
a cutting device comprising a cutting blade defining a cutting plane;
a cutting device attachment assembly for securing said cutting device to said support post, wherein said cutting device attachment assembly allows for said cutting device to be in a movable cutting configuration where said cutting device moves in relation to said work table and a fixed cutting configuration where said cutting device is fixed in relation to said work table; and
a detachable fence, wherein said fence is movable between a first position where said fence is substantially perpendicular to said cutting plane and a second position where said fence is substantially parallel to said cutting plane, and when said cutting device is in said movable cutting configuration and said fence is in said first position said cutting apparatus is in a miter saw mode and when said cutting device is in said fixed cutting configuration and said fence is in said second position, thereby allowing said fence and said void portion to define a first work piece path, said cutting apparatus is in a table saw mode.

2. The work piece cutting apparatus according to claim 1, wherein, when in said miter saw mode, said fence in said first position defines a portion of a second work piece path that extends from one table side to the other side.

3. The work piece cutting apparatus according to claim 1, wherein said cutting device attachment assembly has one of a joint and a hinge so that when said cutting device is in said movable cutting configuration, said cutting device is movable between an upper position and a lower position.

4. The work piece cutting apparatus according to claim 1, wherein said cutting device attachment assembly has a means for fixing said cutting device so that when said cutting device is in said fixed cutting configuration, said cutting device is fixed relative to said work table.

5. The work piece cutting apparatus according to claim 1, wherein said work table has at least one cutting slot.

6. The work piece cutting apparatus according to claim 1, wherein said first work piece path is defined by said fence and said void portion extends from said front of said work table to said rear of said work table.

7. The work piece cutting apparatus according to claim 1, wherein said support post has a shape selected from the group consisting of a "C" shape and an "L" shape.

8. The work piece cutting apparatus according to claim 1, wherein said fence has a quick release fastening member detachably securing said fence to said work table in said first position and said second position.

9. The work piece cutting apparatus according to claim 1, wherein attachment between said work table and said base is a movable attachment and said work table is movable to a plurality of angle orientations relative to said base.

10. The work piece cutting apparatus according to claim 9, wherein said work table has a locking mechanism that locks said work table in said plurality of angle orientations.

* * * * *